(12) United States Patent
Oliver et al.

(10) Patent No.: US 11,233,382 B2
(45) Date of Patent: Jan. 25, 2022

(54) CHILD-RESISTANT COVER APPARATUS FOR ELECTRICAL OUTLETS AND METHOD FOR OPENING A CHILD-RESISTANT COVER APPARATUS

(71) Applicant: AO SQUARED LLC, Boonville, IN (US)

(72) Inventors: Austin Oliver, Lynnville, IN (US); Alex Oliver, Boonville, IN (US)

(73) Assignee: AO SQUARED, LLC, Boonville, IN (US)

( * ) Notice: Subject to any disclaimer, the term of this patent is extended or adjusted under 35 U.S.C. 154(b) by 0 days.

(21) Appl. No.: 17/065,600

(22) Filed: Oct. 8, 2020

(65) Prior Publication Data
US 2021/0151968 A1 May 20, 2021

Related U.S. Application Data

(60) Provisional application No. 62/935,309, filed on Nov. 14, 2019.

(51) Int. Cl.
*H02G 3/14* (2006.01)
*H01R 13/447* (2006.01)

(52) U.S. Cl.
CPC ............ *H02G 3/14* (2013.01); *H01R 13/447* (2013.01)

(58) Field of Classification Search
CPC ............ H02G 3/14; H02G 3/083; H02G 3/18; H02G 3/081; H02G 3/08; H02G 3/10;
(Continued)

(56) References Cited

U.S. PATENT DOCUMENTS 4,851,612 A * 7/1989 Peckham ........... H01R 13/6395
174/67
4,968,856 A * 11/1990 Bowley ............... H01R 13/447
174/67
(Continued)

*Primary Examiner* — Angel R Estrada
(74) *Attorney, Agent, or Firm* — Martin IP Law Group; C. Richard Martin

(57) ABSTRACT

A child-resistant cover apparatus for an electrical device in a wall comprising a housing, a cover door and a child safety latch. The housing surrounds the electrical outlet, and includes a planar baseplate having one or more openings therein for receiving the electrical device and a frame engaging the outer edges of the baseplate. The cover door is attached to the frame in a manner that permits the door to be selectively moved from an open position wherein the electrical device is exposed, and a closed position wherein the electrical device is covered by the cover door. The child safety latch is located proximate to an edge of the cover door and comprises a latch member disposed in an opening in the cover door. The latch member is selectively movable from a first unlocked position wherein a lip of the latch member is retracted into the opening in the cover door, and a second locked position wherein the lip is extended beyond the edge of the cover door and engages a slot in the frame of the housing. The cover door includes a plurality of elongated openings in an outer surface thereof. The elongated openings are in the area of the opening in the cover thereby exposing the latch member to the exterior of the cover door through the elongated openings.

18 Claims, 12 Drawing Sheets

(58) Field of Classification Search
CPC .... H01R 13/447; H01R 13/443; H01R 13/44; H01R 13/453; H01R 13/46
USPC .......... 174/66, 67, 57, 53, 58, 481, 480, 50; 220/3.2–3.9, 4.02, 241, 242; 439/135, 439/136, 145, 195, 137, 148, 346, 732, 439/140
See application file for complete search history.

(56) References Cited

U.S. PATENT DOCUMENTS

| | | | | |
|---|---|---|---|---|
| 5,389,740 | A * | 2/1995 | Austin | H02G 3/10 174/67 |
| 6,519,208 | B2 * | 2/2003 | DeVries | G04G 15/00 368/10 |
| 7,458,479 | B1 | 12/2008 | Thompson | |
| 7,485,804 | B2 | 2/2009 | Dinh et al. | |
| 7,633,009 | B1 * | 12/2009 | Baldwin | H02G 3/14 174/66 |
| 7,674,975 | B2 * | 3/2010 | Atkinson | H01R 13/447 174/66 |
| 8,115,100 | B2 * | 2/2012 | Peckham | H01R 24/76 174/67 |
| 8,231,022 | B2 | 7/2012 | Goldenne et al. | |
| 8,399,765 | B1 * | 3/2013 | Baldwin | H02G 3/14 174/67 |
| 8,563,859 | B1 * | 10/2013 | Baldwin | H02G 3/14 174/67 |
| 8,739,997 | B1 | 6/2014 | Ploof | |
| 9,887,528 | B2 * | 2/2018 | Melistas | H02G 3/14 |

* cited by examiner

CHILD-RESISTANT COVER APPARATUS FOR ELECTRICAL OUTLETS AND METHOD FOR OPENING A CHILD-RESISTANT COVER APPARATUS

BACKGROUND OF THE INVENTION

Field of the Invention

The present invention relates to a cover apparatus for electrical outlets, including electrical sockets, switches and other electrical devices. More specifically, the present invention relates to a cover apparatus mountable to a conventional wall-mounted electrical outlet with safety features for preventing access to the electric outlet by an infant or small child.

Description of the Related Art

There have been many accidents that happen when small children accidentally insert objects into electrical outlets thus resulting in electrical shock. Most homes have the electrical outlets that are uncovered and readily visible to children, which may cause a child to insert an object into the openings, many times with serious consequences. The most common way of protecting children against accidental contact with electrical outlets is by the use of childproof plastic covers. The cover must be removed and set aside before the electrical outlet can be used. For one, the cover is cumbersome to insert and remove, and further it can still be removed by children with some force and/or easily lost or become a choking hazard.

An alternative to plastic covers is tamper resistant electrical outlets. Tamper resistant outlets have slidable outlet blocks that sit behind the front face of the electrical device and move to an open position when an electrical plug is properly inserted. However, when another object or the plug is improperly inserted, the blocks prevent the object from contacting the electrified portions of the outlet. The tamper resistant electrical outlet although effective, has a number of disadvantages, including that it is cumbersome to operate and involves difficult installation that may require a professional electrician.

Accordingly, there is a need for an apparatus to cover an existing wall-mounted electrical outlet, and prevent access to the electric outlet by an infant or small child by incorporating sufficient and effective safety features therein.

SUMMARY OF THE INVENTION

It is therefore an object of the invention to provide a cover apparatus which can be easily closed and opened between locked position and unlocked position to provide an effortless access to the electrical outlet.

It is also an object of the invention to provide a cover apparatus with a child safety feature to prevent access to the electrical outlet by an infant or small child.

It is also an object of the invention to provide a cover apparatus in which a cover door may be retracted when desired, to provide unrestricted access to the electrical outlet housed therein.

It is further an object of the invention to provide a cover apparatus which can be mounted flushed to or recessed into the wall creating an esthetic look.

The present invention meets these objects by providing the cover apparatus with a child safety latch which can only be disengaged by inserting a standard electrical plug; a spring clip which automatically locks a cover door to housing of the cover apparatus upon closing the cover door and unlocks the cover door by a simple press in order to open the cover door; a slidable cover door which can be pushed towards rearward of housing to be retracted into the wall in order to be hiding from plain view; and a recess in the housing for flushing the cover apparatus against the wall.

According to one presently preferred embodiment of the invention, there is provided a child-resistant cover apparatus for an electrical device in a wall comprising a housing, a cover door and a child safety latch. The housing surrounds the electrical outlet, and includes a planar baseplate having one or more openings therein for receiving the electrical device and a frame engaging the outer edges of the baseplate. The cover door is attached to the frame in a manner that permits the door to be selectively moved from an open position wherein the electrical device is exposed, and a closed position wherein the electrical device is covered by the cover door. The child safety latch is located proximate to an edge of the cover door and comprises a latch member disposed in an opening in the cover door. The latch member is selectively movable from a first unlocked position wherein a lip of the latch member is retracted into the opening in the cover door, and a second locked position wherein the lip is extended beyond the edge of the cover door and engages a slot in the frame of the housing. The cover door includes a plurality of elongated openings in an outer surface thereof. The elongated openings are in the area of the opening in the cover thereby exposing the latch member to the exterior of the cover door through the elongated openings.

The plurality of elongated openings may preferably comprise two elongated openings arranged in parallel a distance apart corresponding to a distance between contact pins of a type A electrical plug. A latch retainer may be fixed to the edge the cover door, with the lip of the latch member extending through a slot in the latch retainer. The latch retainer may include hooked members which may engage with apertures formed in the cover door to fix the latch retainer in the cover door. The latch member may be biased such that the lip of the latch member projects from the slot in the latch retainer in a resting position. The latch member may further include a pair of elongate grooves aligned with the elongate openings in the cover door.

The housing may be partially recessed in the wall, or it may be mounted flush with the wall.

The cover door may include a hinge at one end thereof to permit rotation of the cover door about said hinge from the open position to the closed position. A casing extending rearward of the housing in a direction generally perpendicular to the base plate and into a cavity of the wall may be provided. The casing may include a slot configured to slidably receive the cover door therein when the cover door is in a fully-open position.

According to an alternative aspect of the invention, the frame of the housing includes a pair of grooves in opposing walls thereof and wherein opposing edges of said cover door are slidably positioned in said grooves. Stops are positioned in each groove near an end thereof to prevent the cover door from being separated from the housing.

The present invention also contemplates a method for opening a child-resistant cover apparatus for an electrical device. First, a pair of flat live contact pins from an electrical plug are inserted through a corresponding pair of elongate openings in a front face of a cover door, which is attached to a frame of a housing of the cover apparatus in a manner that permits the door to be selectively moved from an open position wherein the electrical device is exposed, and a closed position wherein the electrical device is covered by said cover door. Second, the pair of flat live contact pins engage with a corresponding pair of elongate grooves formed in a latch member of the cover apparatus. The latch member may be disposed in an opening in the cover door and having a lip that extends beyond the edge of the cover door and engages a slot in the frame of said housing. Third, lateral pressure is applied to the electrical plug thereby forcing the latch member to move in a direction wherein the lip is withdrawn into the opening in the cover door and disengages the slot in the frame housing. Lastly, the cover door is moved to an open position wherein the electrical device is exposed.

The step of moving the cover door to an open position may comprise sliding the cover door sideways in grooves located in opposing walls of the frame of the housing. The cover door may be slid until projections in the cover door come into contact with stops positioned in the opposing grooves.

Alternatively, the step of moving the cover door to an open position may comprise rotating the cover door about a hinge at one end until the cover door is substantially perpendicular to the housing. The cover door may then be slid into a slot of a casing extending rearward of the housing in a direction generally perpendicular to the base plate and into a cavity of the wall.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
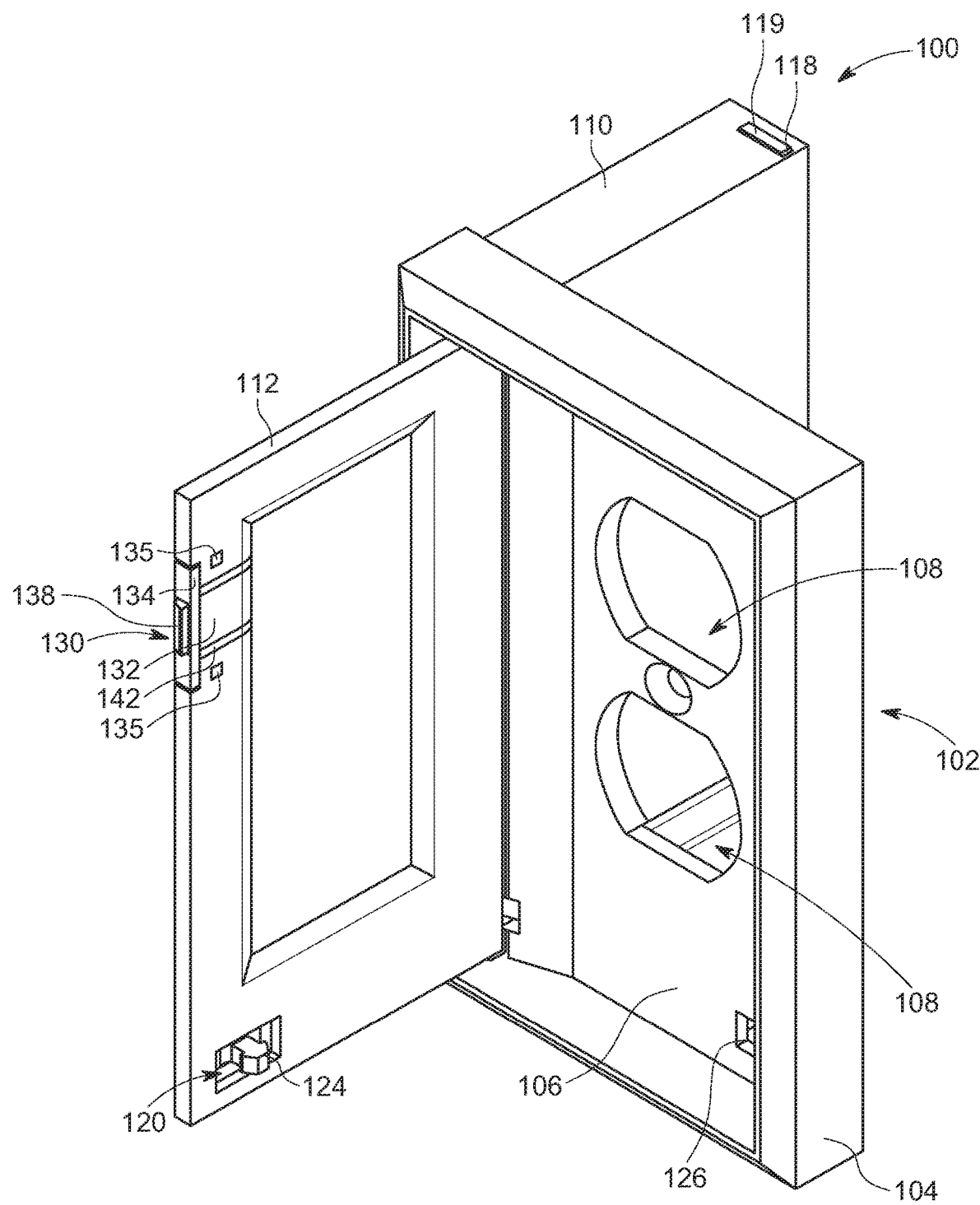
FIG. 1 is a diagrammatic perspective view of a cover apparatus for electrical outlets with a cover door disposed in open position thereof, in accordance with an exemplary embodiment of the present invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in FIG. 1, one presently preferred embodiment of the invention comprises a cover apparatus (generally designated by the numeral 100). The cover apparatus 100 is employed for restricting access to an electrical outlet by a young child, an infant and the like. The cover apparatus 100 is constructed and arranged for mounting to a conventional electrical outlet installed in a wall. As used herein, wall-mounted electrical outlets may provide various electrical devices including, but not limited to, power sockets, light switches, thermostats, alarm key pads, and home electronic control panels.

Figure 2:
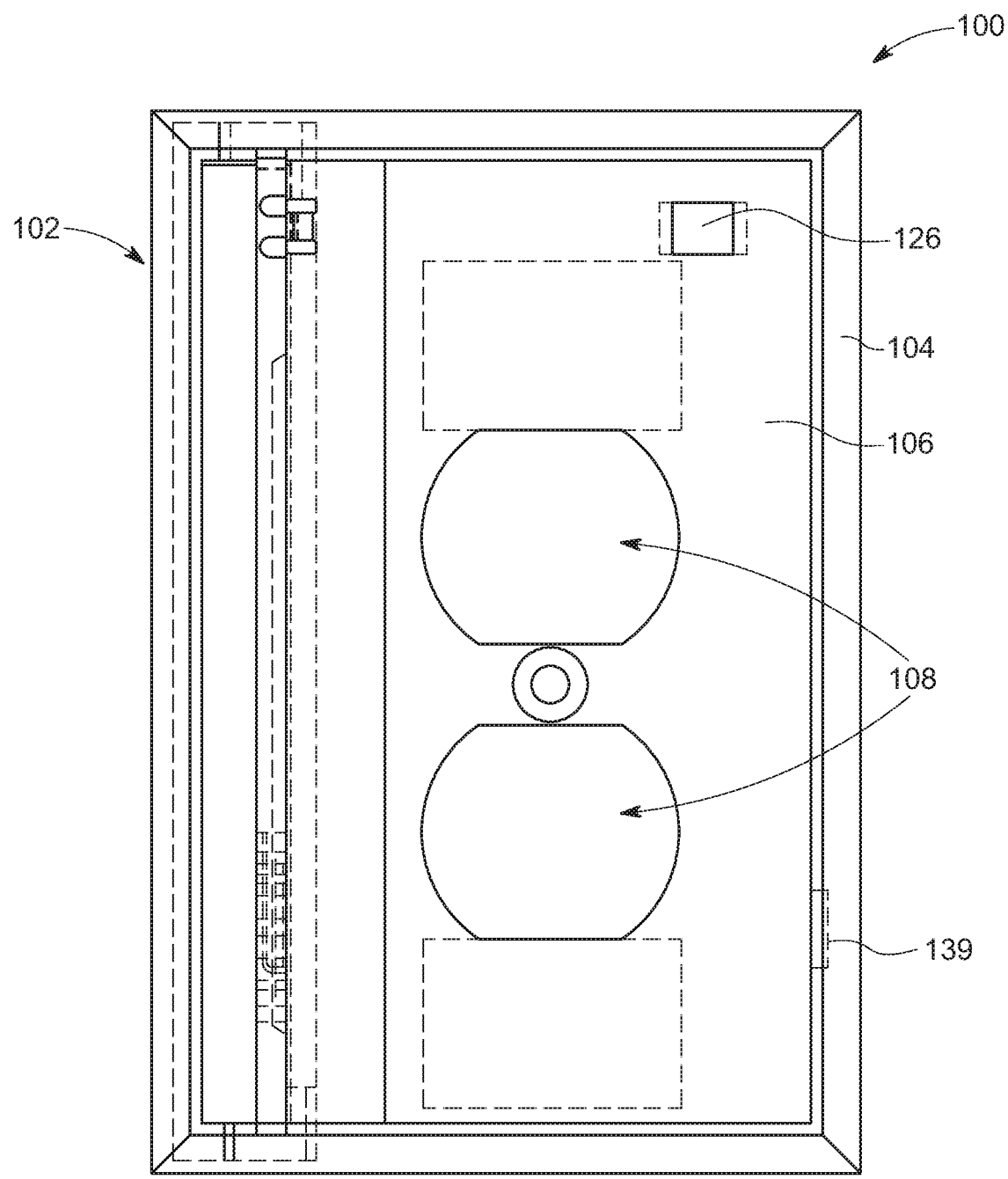
FIG. 2 is a planar front view of the cover apparatus of FIG. 1 as seen from X direction therein, in accordance with an exemplary embodiment of the present invention.

As shown, the cover apparatus 100 incudes a housing 102. The housing 102 is in the shape of an enclosure which can be used to conceal wall-mounted electrical outlets, and thereby prevent access to the electric outlet by an infant or small child, and further reduce their visible appearance and improve the aesthetics of the overall room. In particular, the housing 102 includes a frame 104 and a base plate 106 fixed within the frame 104. As best shown in FIG. 2, the frame 104 is generally rectangular in shape. However, it may be appreciated that in other examples, the frame 104 may have any other suitable shape without any limitations. Further, as shown, the base plate 106 includes required openings 108 to accommodate the electrical outlets, such as power sockets. While the base plate 106 is shown to have two openings 108, it may be configured to have as few or as many openings to match the configuration of the electrical outlet. Furthermore, the openings 108 may be of any required shapes and sizes as known for accommodating any known type of standard electrical outlet onto which the cover apparatus 100 is to be installed, as will be discussed later in the description. Herein, the housing 102 can be manufactured at a low cost using basic injection molding principals and can be decorated by using techniques that are common to the industry.

Figure 6:
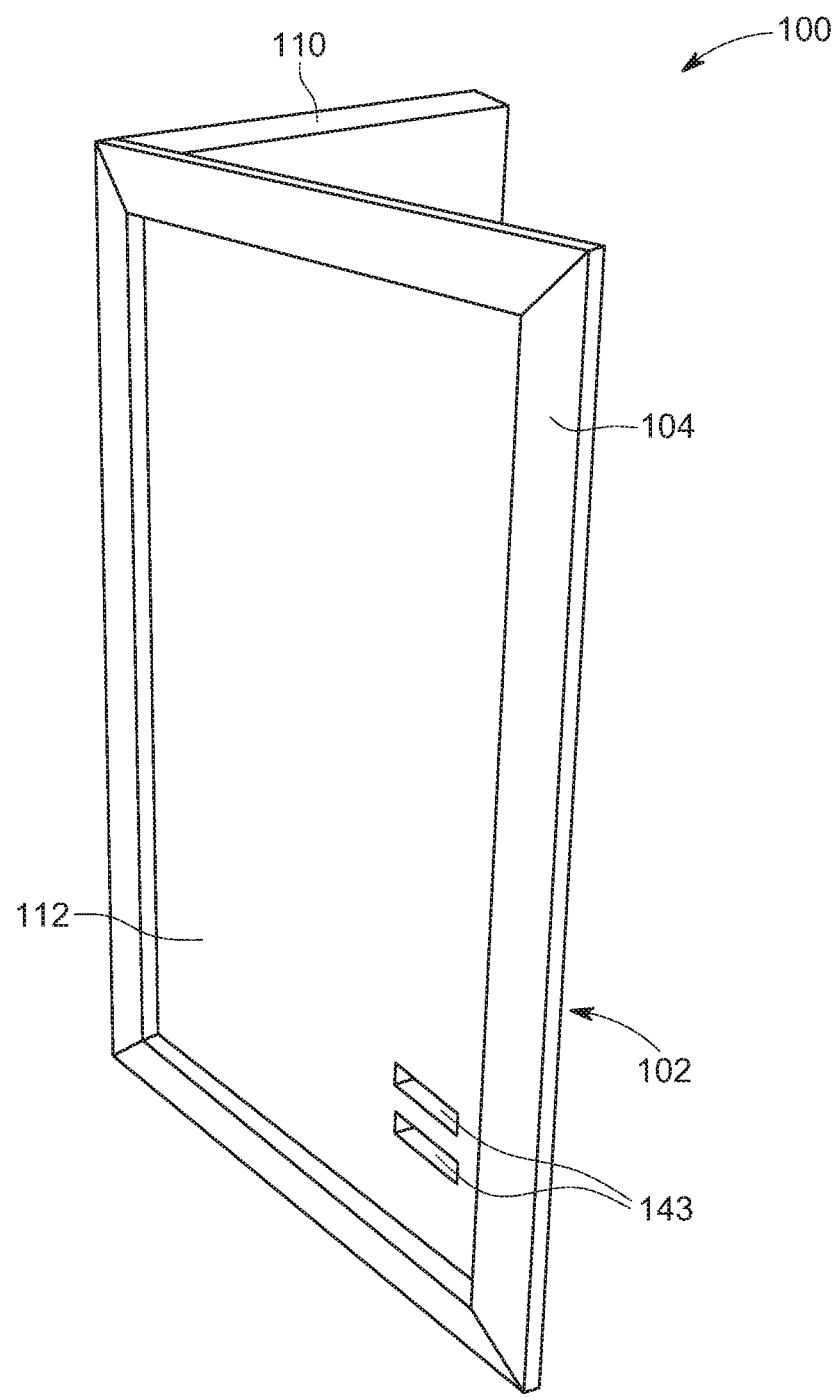
FIG. 6 is a perspective front view of a recessed cover apparatus according to a further aspect of the invention, with the cover door disposed in closed position thereof, in accordance with an exemplary embodiment of the present invention.
Figure 7:
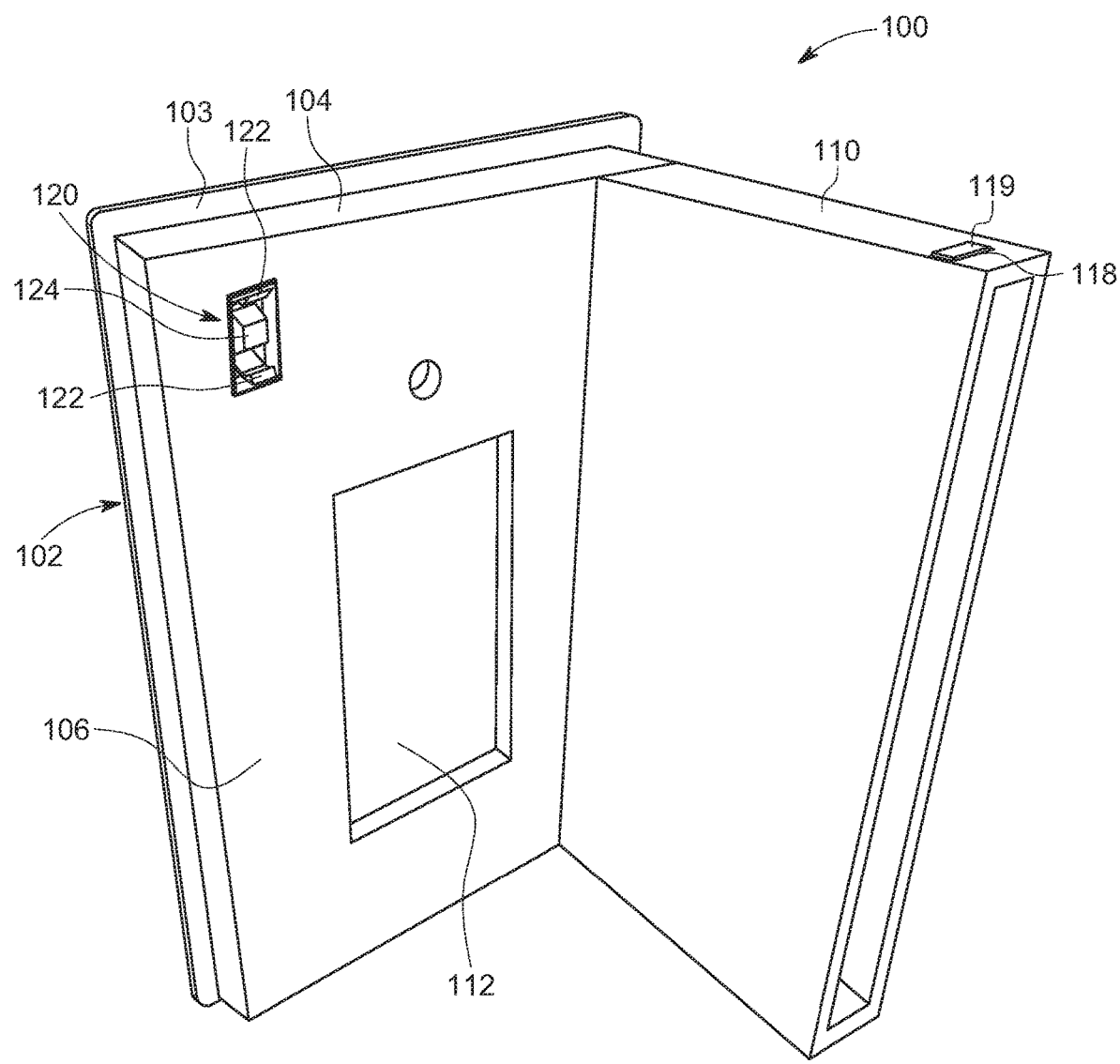
FIG. 7 is a perspective rear view of the cover apparatus of FIG. 6 with the cover door disposed in closed position thereof, in accordance with an exemplary embodiment of the present invention.
Figure 10:
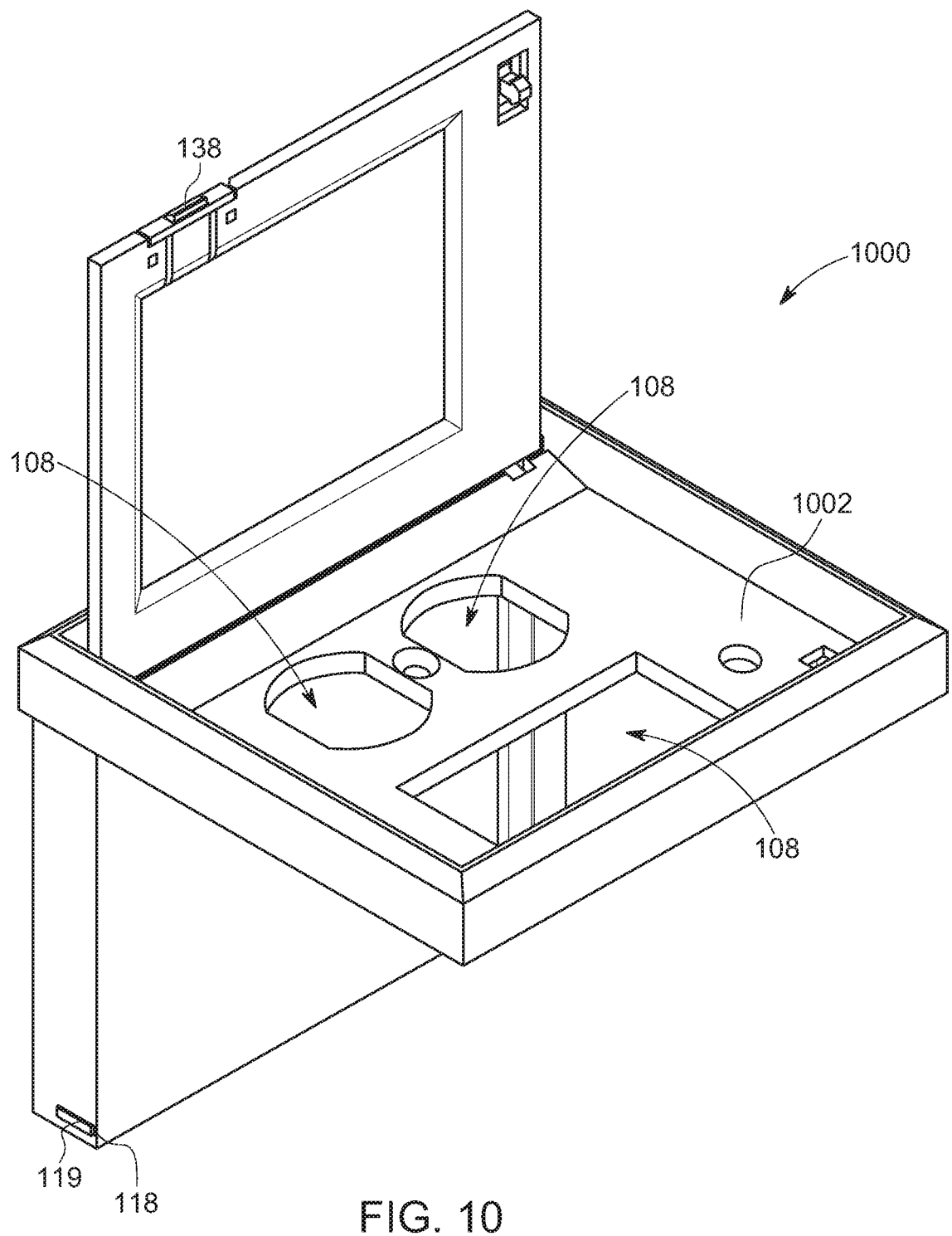
FIG. 10 is a diagrammatic perspective view of cover apparatus for electrical outlets, in accordance with another exemplary embodiment of the present invention.
Figure 11:
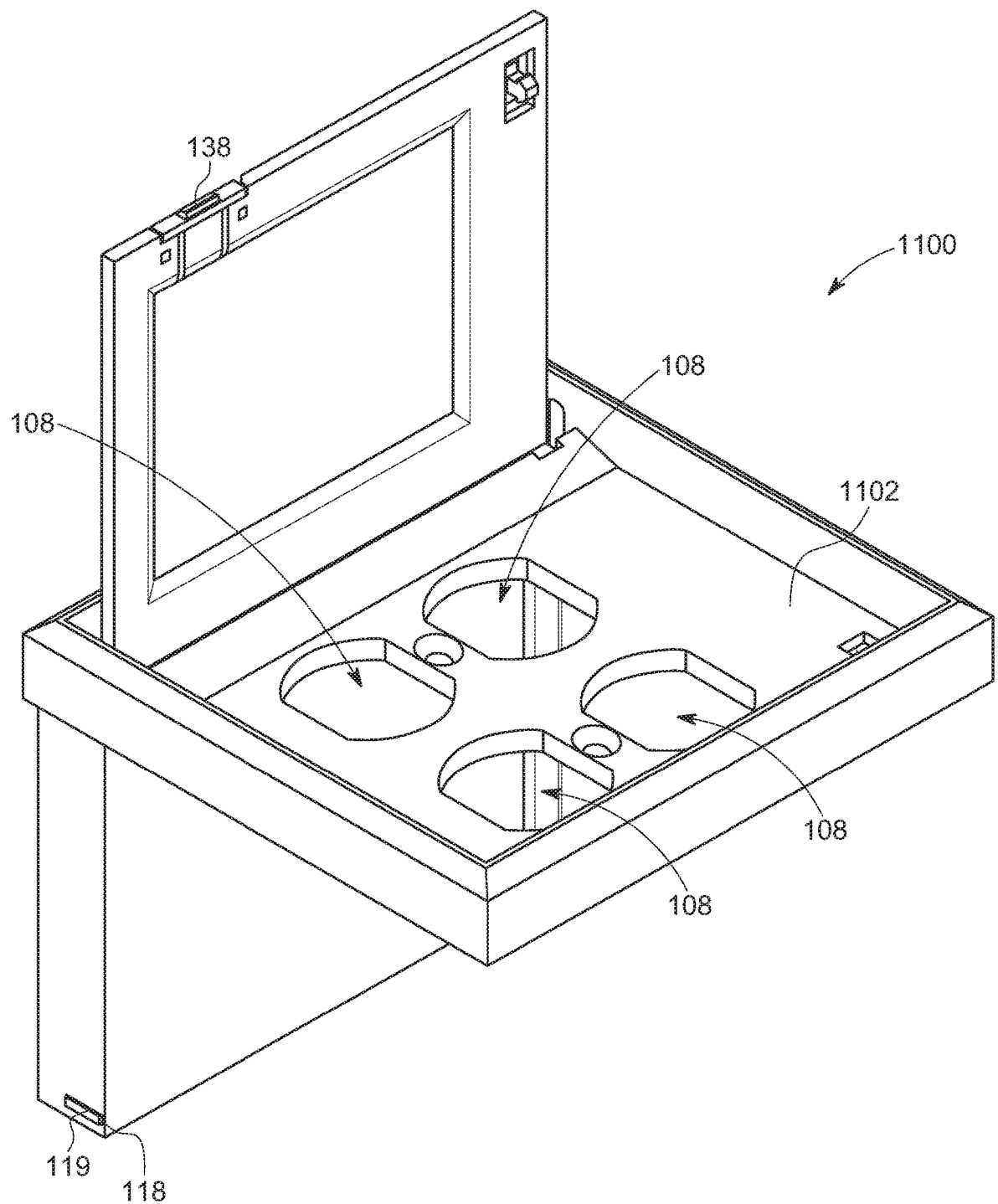
FIG. 11 is a diagrammatic perspective view of cover apparatus for electrical outlets, in accordance with yet another exemplary embodiment of the present invention.

In the present embodiments, the cover apparatus 100 is designed to either sit flush with or be recessed into a wall such as an interior wall of a home or building. Herein, FIGS. 1-4 and further FIGS. 10-11 show an embodiment of the cover apparatus 100 with the housing 102 designed to sit on the wall. Further, FIGS. 6-7 show an embodiment of the recessed cover apparatus 100 with the housing 100 designed to be at least partially recessed into the wall when the cover apparatus 10 is mounted thereon. In the recessed cover apparatus 100, as best shown in FIG. 7, the housing 102 is recessed to provide flanges 103 towards rear side thereof, with the base plate 106 defining the rear wall therefor. Herein, it may be understood that the wall is cut to provide a rectangular cavity with area substantially equal to the area of the base plate 106. With such configuration when the cover apparatus 100 is installed on the wall, the housing 102 sits flush with the wall with the flanges 103 abutting boundaries of the cavity in the wall. It may be noted that the base plate 106 is positioned inside the cavity in the wall with the electrical outlets recessed therein. It may be appreciated that with such design, the cover apparatus 100 is mounted flushed against the wall creating an esthetic look for the room.

Figure 3:
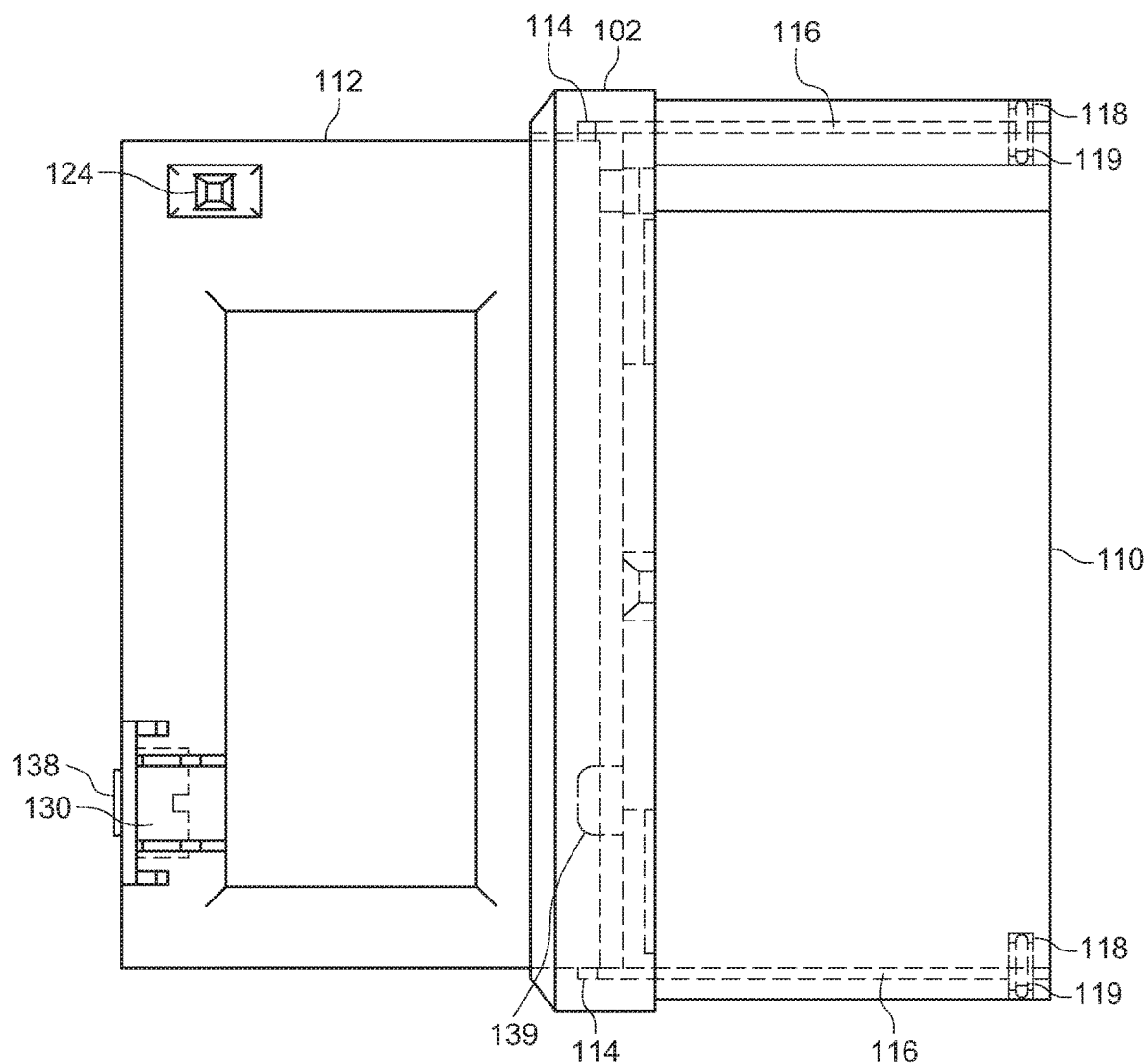
FIG. 3 is a planar side view of the cover apparatus of FIG. 1 as seen from Y direction therein, in accordance with an exemplary embodiment of the present invention.
Figure 4:
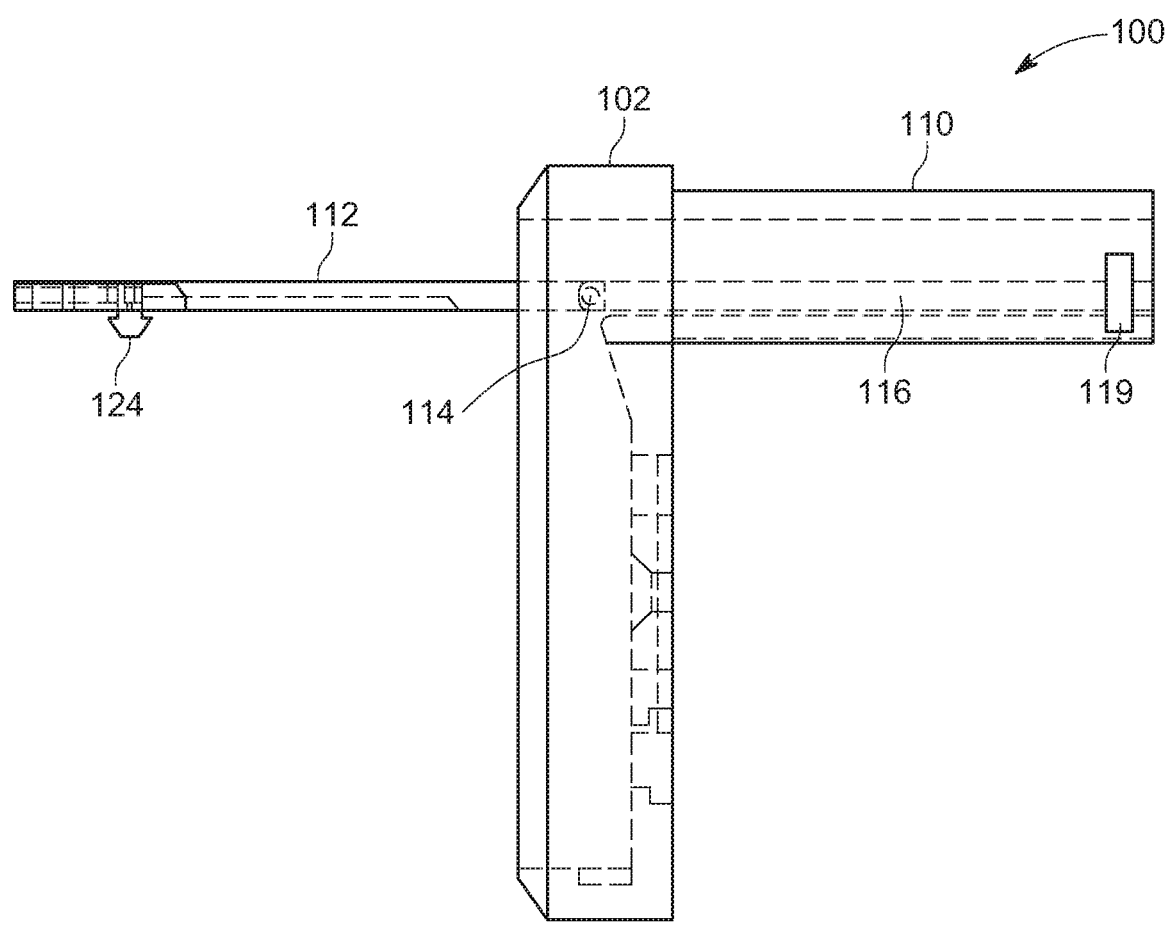
FIG. 4 is a planar top view of the cover apparatus of FIG. 1 as seen from Z direction therein, in accordance with an exemplary embodiment of the present invention.
Figure 5:
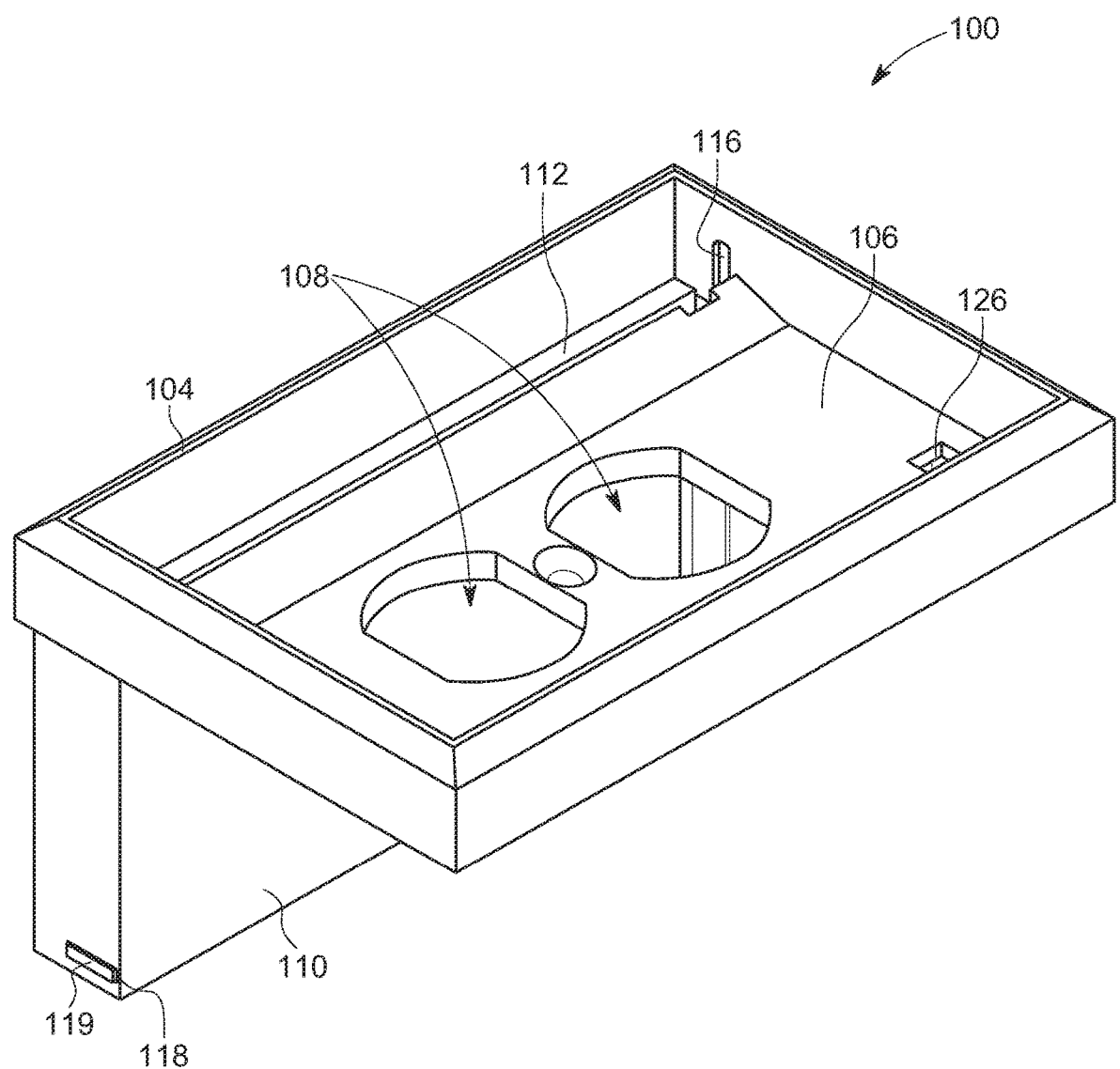
FIG. 5 is a diagrammatic perspective view of the cover apparatus of FIG. 1 with the cover door slid into the casing, in accordance with an exemplary embodiment of the present invention.

Further, as shown, the cover apparatus 100 includes a casing 110. As best shown in FIGS. 3 and 4 (and further in FIG. 5), the casing 110 extends rearward of the housing 102. The casing 110 extends in a direction generally perpendicular to the base plate 106. When the cover apparatus 100 is installed against a wall, the casing 110 is positioned inside the wall. For this purpose, a rectangular elongated cavity may have to be cut or be made in the wall to accommodate the casing 110, before the cover apparatus 100 is installed against the wall. The casing 110 may be formed integral with (such as, with molding) or separate from (and subsequently attached to) the housing 102. In the present examples, the casing 110 is generally a hollow cuboidal shaped member.

Figure 8:
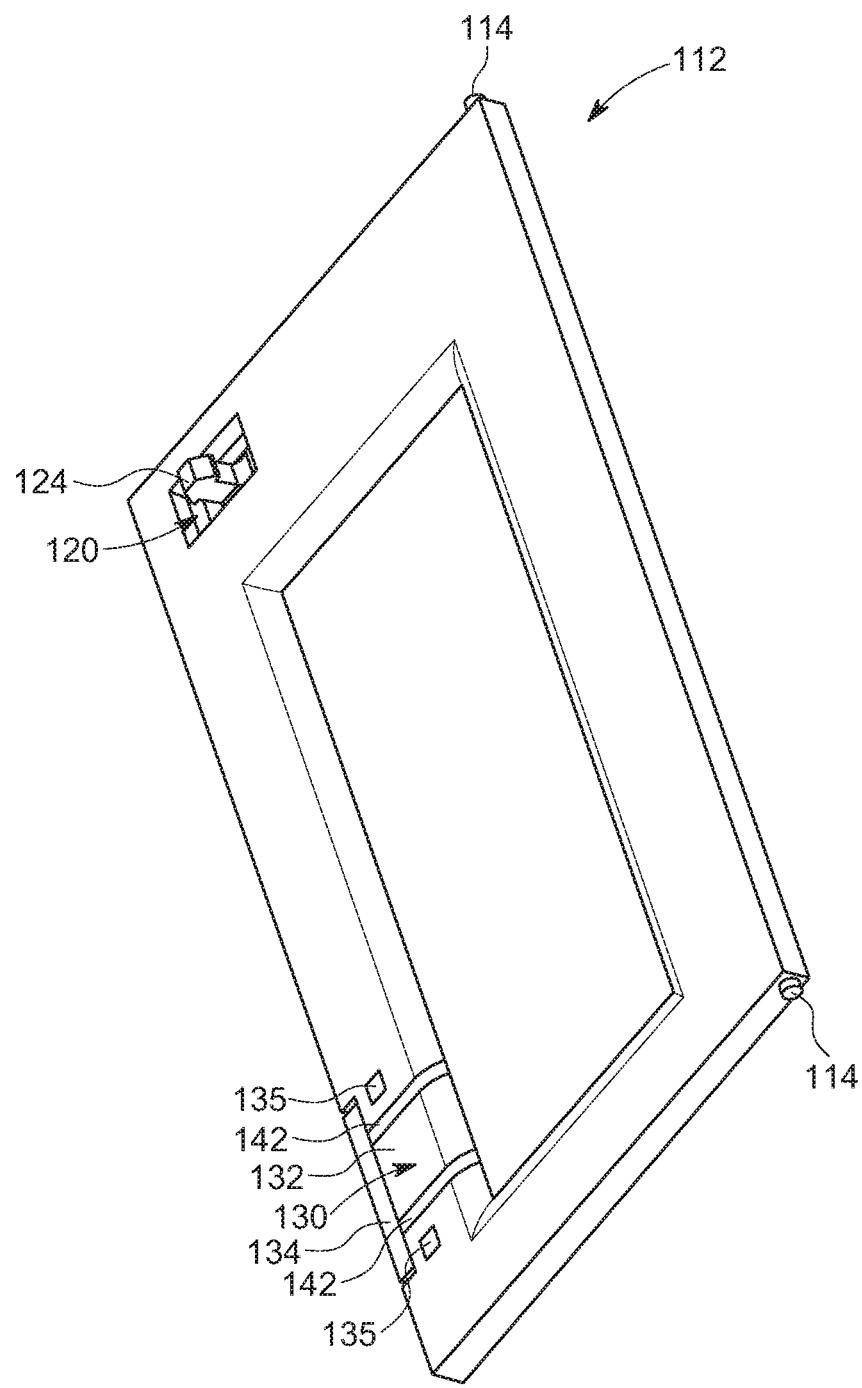
FIG. 8 is a diagrammatic perspective view of a cover door for the cover apparatus, in accordance with an exemplary embodiment of the present invention.

Also, as shown, the cover apparatus 100 includes a cover door 112. The cover door 112 may generally be rectangular shaped piece (as best shown in FIG. 8). The cover door 112 is arranged to be slidable into the casing 110 in a direction generally perpendicular to the base plate 106 (by moving in the rearward direction of the base plate 106). In some examples, the casing 112 may include guide tracks or channels (not shown) formed therein to allow for smooth sliding of the cover door 112 inside thereof. Herein, the casing 112 is designed to receive the cover door 112 therein. It may be appreciated that the volume of the hollow portion inside the casing 110 may generally be sufficient to allow for proper sliding and accommodation of the cover door 112 therein.

As may be seen from FIGS. 3 and 4 (and further in FIG. 8), the cover door 112 may include protrusions 114 extending from upper edge and lower edge thereof. Further, as may be seen from FIGS. 3 and 4 (and further in FIG. 5), the housing 102 may include slots 116 formed in upper inner side and lower inner side of the frame 104 thereof. The slots 116 may be formed at the portion of the housing 102 where the casing 110 is extending therefrom (or attached therewith). The slots 116 may extrude slightly in forward direction with respect to the base plate 106. As shown, the cover door 112 is coupled to the housing 102 by supporting the protrusions 114 in the slots 116. This way when the cover door 112 is slid out of the casing 110 (i.e. in the forward direction), the cover door 112 can be pivoted about axis of the protrusions 114 engaged at forward ends of the slots 116 in order to cover the base plate 106 and thereby the openings 108 (and any electrical outlets extending therefrom). Furthermore, it may be appreciated that when the cover door 112 is slid in the rearward position, the cover door 112 is substantially retracted and stowed within the casing 110. In the retracted position of the cover door 112, the cover apparatus permits unobstructed access to the base plate 106 and any electrical outlets supported in the openings 108 therein; and may further help when the electrical receptacle is required to be retained accessible for a long duration. Also, as seen from FIGS. 3 and 4 (and further in FIG. 5), the casing 110 may include slots 118 formed proximal to rearward edge thereof. In an embodiment, door retainers 119 are inserted inside the slots 118 for restricting a sliding a movement of the cover door 112 to keep the cover door 112 from sliding too far into the casing 110 such that a person could not retrieve the door for closing. The presence of the door retainers also allows the door 112 to be replaced in the event that it is broken or the user desires a different style door. The cover door 112 engages with door retainers 119 when the cover door 112 is slid into the casing 110 to prevent further movement thereof, such that a forward edge of the cover door 112 is always accessible outside of the casing 110 for pulling the cover door 112 out therefrom. The cover door 112 may further include projections 114 adapted to travel over any guide tracks or channels formed inside the casing 110 for allowing smooth sliding of the cover door 112 therein. The projections 114 also facilitates a rotational movement of the cover door 112 and may act as hinges about which the cover door 112 is adapted to rotate.

Also, as best shown in FIG. 1 and FIG. 8, the cover apparatus 100 includes a locking mechanism 120 to hold the cover door 112 against the housing 102, when in closed position. The locking mechanism 120 is operatively associated with the cover door 112 and the base plate 106 for locking the cover door 112 relative to housing 102 in the closed position thereof. In one example, the locking mechanism 120 may include a pair of spring-loaded clips 122, and a hooked member 124. The hooked member 124 may extend from an inner surface of the cover door 112 and configured to engage with the clips 122. The clips 122 are received by cooperative recess 126 that extend through the base plate 106. When the cover door 112 is disposed into the closed position, the hooked member 124 is engaged by the clips 122 to retain the cover door 112 and lock the cover door 112 covering the base plate 106. To open the cover door 112, a user may need to push the cover door 112 with a sufficient amount of opening force at outer surface thereof (around the region corresponding to the clips 122) to disengage the hooked member 124 from the clips 122.

Figure 9:
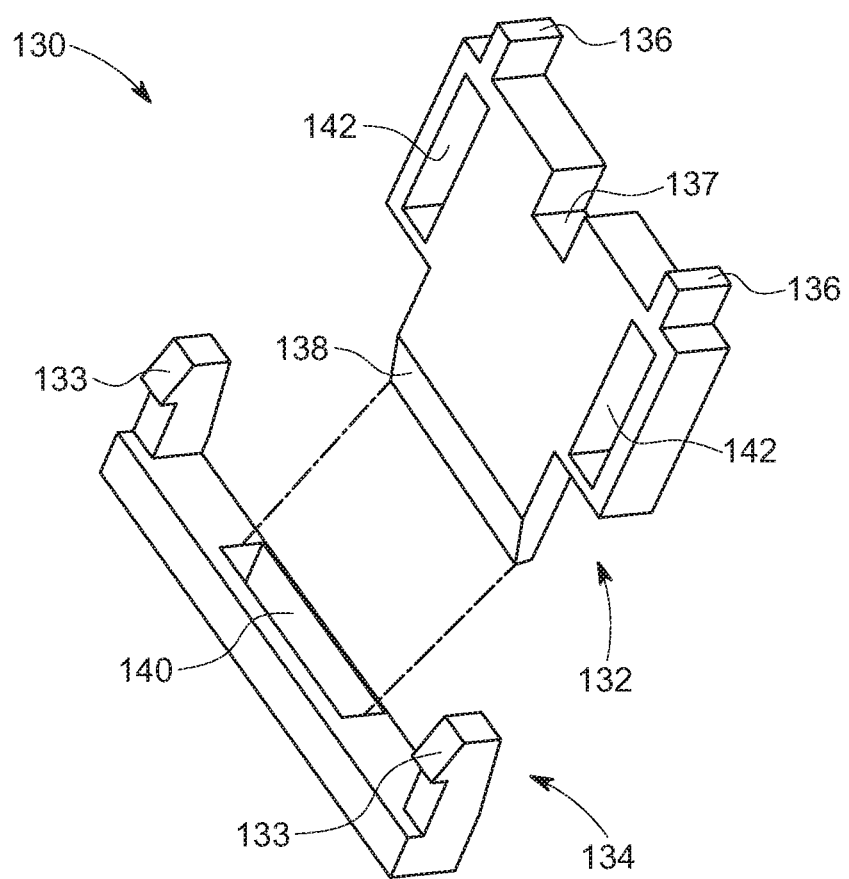
FIG. 9 is a diagrammatic exploded view of a child safety latch for the cover apparatus, in accordance with an exemplary embodiment of the present invention.

Further, as best shown in FIG. 1 and FIG. 8, the cover apparatus 100 includes a child safety latch 130 to restrict opening of the cover door 112 by a child or an infant. FIG. 9 provides a detailed view of the child safety latch 130 and components thereof. Referring to the figures in combination, the child safety latch 130 includes a latch member 132 and a latch retainer 134. Herein, the latch retainer 134 may be fixed to free vertical edge the cover door 112. As shown, the latch retainer 134 include hooked members 133 which may engage with apertures 135 formed in the cover door 112 to fix the latch retainer 134 in the cover door 112. Further, the latch member 132 may be fixed to the cover door 112 to a corresponding region with respect to the latch retainer 134. The latch member 132 may be spring biased using springs (not shown) coupled to legs 136 and/or notch 137 thereof. A lip 138 of the latch member 132 may be pushed through a slot 140 in the latch retainer 134 due to a bias force provided by the said springs, and may further extend to a corresponding slot 139 (as may be seen from FIGS. 2-3) in the inner sidewall of the frame 104 of the housing 102 in order to lock the cover door 112 against the housing 102, when the cover door 112 is in closed position thereof. In order to disengage the latch member 132 from the frame 104, a standard type A plug (or NEMA-1) having two flat live contact pins, which are arranged in parallel at a preferred distance of 12.7 mm, may be inserted through elongate openings 143 (as shown in FIG. 6) in the front face of the cover door 112 that correspond to elongate grooves 142 formed in the latch member 132. Subsequently the latch member 132 may be forced to move in a direction away from the latch retainer 134 (against the biasing force of the springs), thereby drawing the lip 138 of the latch member 132 into the slot 140 in the latch retainer 134; and in turn disengaging the lip 138 from the slot 139 in the inner sidewall of the frame 104, thus unlocking the cover door 112 to be moved into open position thereof.

FIG. 10 shows a cover apparatus 1000 for electrical outlets, in accordance with another exemplary embodiment of the present invention. As shown in FIG. 10, the cover apparatus 1000 is formed by modifying the cover apparatus 100 (as described above) to provide a GFCI (Ground Fault Circuit Interrupter) outlet in the base plate 1002 thereof. Further, FIG. 11 shows a cover apparatus 1100 for electrical outlets, in accordance with yet another exemplary embodiment of the present invention. As shown in FIG. 11, the cover apparatus 1100 is formed by modifying the cover apparatus 100 (as described above) to provide dual electrical outlets in the base plate 1102 thereof. It may be appreciated that other components, design and features of the cover apparatuses 1000 and 1100 remains the same as that of the cover apparatus 100.

Figure 12:
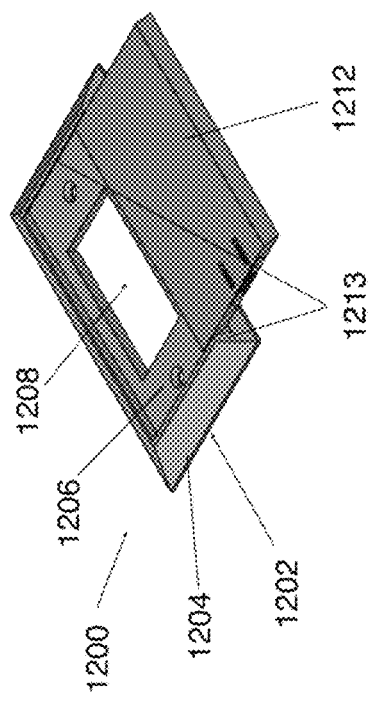
FIG. 12 is a perspective view of a cover apparatus for electrical outlets with a cover door disposed in open position thereof, in accordance with an alternative exemplary embodiment of the present invention.
Figure 14:
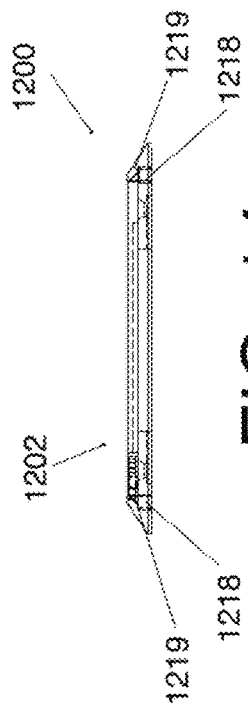
FIG. 14 is a planar side view of the cover apparatus of FIG. 12 as seen from Y direction therein, in accordance with an alternative exemplary embodiment of the present invention.

FIG. 12-FIG. 15 show a cover apparatus 1200 for electrical outlets, in accordance with another exemplary embodiment of the present invention. As shown in FIG. 12, the door 1212 is configured to slide laterally to open rather than pivoting open and sliding into a recess as in the previous embodiments. As shown, the cover apparatus 1200 includes a housing 1202 that includes a frame 1204 and a base plate 1206 fixed within the frame 1204. Further, as shown, the base plate 1206 includes required openings 1208 to accommodate the electrical outlets, such as a GFCI power socket. The cover door 1212 may generally be rectangular shaped piece (as best shown in FIG. 12). The cover door 1212 is arranged to be laterally slidable in a direction generally parallel to the base plate. The casing 1212 include guide tracks or channels 1213 formed therein. Protrusions 1214 extending from the upper edge and lower edge of the cover door 1212 are slidably disposed in the channels 1213 to allow for smooth sliding of the cover door 1212.

Figure 13:
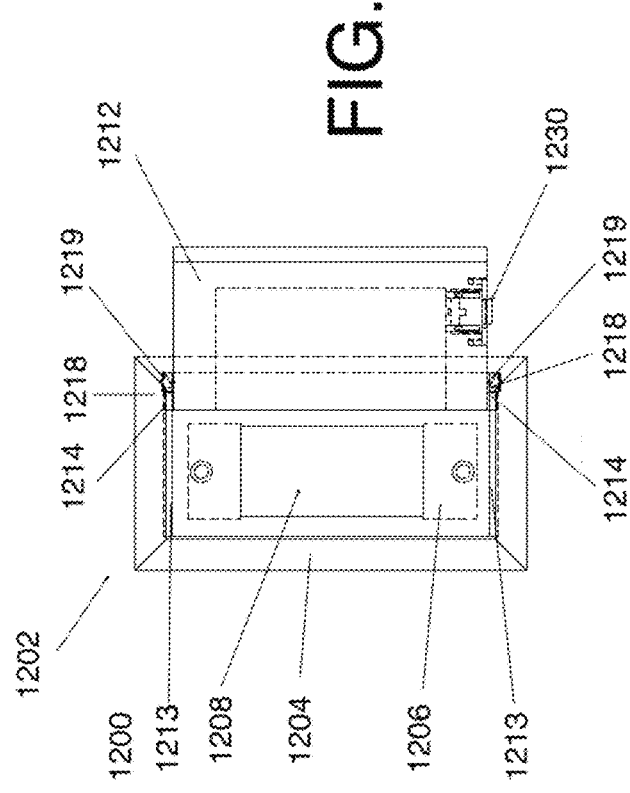
FIG. 13 is a planar front view of the cover apparatus of FIG. 12 as seen from X direction therein, in accordance with an alternative exemplary embodiment of the present invention.
Figure 15:
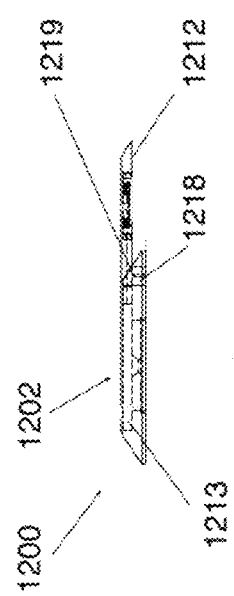
FIG. 15 is a planar top view of the cover apparatus of FIG. 12 as seen from Z direction therein, in accordance with an alternative exemplary embodiment of the present invention.

In the open position, as shown in FIG. 12-FIG. 15, the cover apparatus permits unobstructed access to the base plate 1206 and any electrical outlets supported in the opening 1208 therein. Also, as seen from FIGS. 13 and 14 (and further in FIG. 15), the casing 1210 may include slots 1218 formed proximal to open side edge thereof. In an embodiment, door retainers 12219 are inserted inside the slots 1218 for restricting a sliding a movement of the cover door 1212 to keep the cover door 1212 from sliding too far out of the casing 1210 such that the door is removed from the casing. Further, as best shown in FIG. 13, the cover apparatus 1200 includes a child safety latch 1230 to restrict opening of the cover door 1212 by a child or an infant. The details of the child latch 1230 for this embodiment are the same as shown in FIG. 9 which provides a detailed view of the child safety latch 130 and components thereof.

The main objective of the invention described above is to provide a cover apparatus (such as, the cover apparatus 100) for electrical outlet that is aesthetically appealing as well as provide a practical and functional means of covering an electrical outlet receptacle's apertures from access by infants and younger children. The cover apparatus described above does this by normally biasing the cover door into the closed position whenever the outlet receptacle is not in use. The spring clip automatically locks the cover door to housing of the cover apparatus upon closing the cover door and unlocks the cover door only after a forceful press at right location. The child safety latch which can only be disengaged by inserting a standard electrical plug ensures that a certain procedure is to be followed for accessing the electrical outlet. These attributes allow for a cover apparatus that cannot be easily manipulated by younger children. A younger child would have a difficult time to open the cover door with provided safety features and thus discourage the child to access the electrical outlet receptacle, while the design of the cover apparatus allows for an adult to open and close the cover door easily for insertion of an electrical plug. The cover apparatus is also more aesthetically appealing than those currently found in the market and it would hide the unsightly electrical outlet receptacles commonly found in most homes.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:
1. A child-resistant cover apparatus for an electrical device in a wall comprising:
   a housing that surrounds the electrical outlet, said housing including a planar baseplate having one or more openings therein for receiving the electrical device and a frame engaging the outer edges of said baseplate;
   a cover door attached to the frame in a manner that permits the door to be selectively moved from an open position wherein said electrical device is exposed, and a closed position wherein said electrical device is covered by said cover door; and
   a child safety latch located proximate to an edge of the cover door, said child safety latch comprising a latch member disposed in an opening in said cover door, said latch member being selectively movable from a first unlocked position wherein a lip of the latch member is retracted into the opening in the cover door, and a second locked position wherein said lip is extended beyond the edge of the cover door and engages a slot in the frame of said housing; and
   wherein said cover door includes a plurality of elongated openings in an outer surface thereof, said elongated openings being in the area of the opening in the cover thereby exposing the latch member to the exterior of the cover door through said elongated openings.

2. The child-resistant cover apparatus according to claim 1 wherein said plurality of elongated openings comprises two elongated openings arranged in parallel a distance apart corresponding to a distance between contact pins of a type A electrical plug.

3. The child-resistant cover apparatus according to claim 2 wherein a latch retainer is fixed to the edge the cover door, and said lip of the latch member extends through a slot in the latch retainer.

4. The child-resistant cover apparatus according to claim 3 wherein the latch retainer include hooked members which may engage with apertures formed in the cover door to fix the latch retainer in the cover door.

5. The child-resistant cover apparatus according to claim 3 wherein the latch member is biased such that the lip of the latch member projects from the slot in the latch retainer in a resting position.

6. The child-resistant cover apparatus according to claim 2 wherein the latch member includes a pair of elongate grooves aligned with the elongate openings in the cover door.

7. The child-resistant cover apparatus according to claim 1 wherein the housing is partially recessed in the wall.

8. The child-resistant cover apparatus according to claim 1 wherein the housing is mounted flush with the wall.

9. The child-resistant cover apparatus according to claim 1 wherein the cover door includes a hinge at one end thereof to permit rotation of the cover door about said hinge from the open position to the closed position.

10. The child-resistant cover apparatus according to claim 9 further comprising a casing extending rearward of the housing in a direction generally perpendicular to the base plate and into a cavity of the wall.

11. The child-resistant cover apparatus according to claim 10 wherein the casing includes a slot configured to slidably receive the cover door therein when the cover door is in a fully-open position.

12. The child-resistant cover apparatus according to claim 1 wherein the frame of the housing includes a pair of grooves in opposing walls thereof and wherein opposing edges of said cover door are slidably positioned in said grooves.

13. The child-resistant cover apparatus according to claim 12 wherein stops are positioned in each groove near an end thereof to prevent the cover door from being separated from the housing.

14. A method for opening a child-resistant cover apparatus for an electrical device comprising the steps of:

inserting a pair of flat live contact pins from an electrical plug through a corresponding pair of elongate openings in a front face of a cover door, said cover door attached to a frame of a housing of the cover apparatus in a manner that permits the door to be selectively moved from an open position wherein said electrical device is exposed, and a closed position wherein said electrical device is covered by said cover door;

engaging the pair of flat live contact pins with a corresponding pair of elongate grooves formed in a latch member of the cover apparatus, said latch member disposed in an opening in the cover door and having a lip that extends beyond the edge of the cover door and engages a slot in the frame of said housing;

applying lateral pressure to the electrical plug thereby forcing the latch member to move in a direction wherein the lip is withdrawn into the opening in the cover door and disengages the slot in the frame housing;

moving the cover door to an open position wherein said electrical device is exposed.

15. The method for opening a child-resistant cover apparatus according to claim 14 wherein the step of moving the cover door to an open position comprises sliding the cover door sideways in grooves located in opposing walls of the frame of the housing.

16. The method for opening a child-resistant cover apparatus according to claim 15 wherein the cover door is slid until projections in the cover door come into contact with stops positioned in the opposing grooves.

17. The method for opening a child-resistant apparatus according to claim 14 wherein the step of moving the cover door to an open position comprises rotating the cover door about a hinge at one end until the cover door is substantially perpendicular to the housing.

18. The method for opening a child-resistant apparatus according to claim 17 further comprising the step of sliding the cover door into a slot of a casing extending rearward of the housing in a direction generally perpendicular to the base plate and into a cavity of the wall.

* * * * *